(12) United States Patent
Stewart

(10) Patent No.: US 8,892,736 B2
(45) Date of Patent: *Nov. 18, 2014

(54) PROVIDING AN ADVERTISEMENT BASED ON A GEOGRAPHIC LOCATION OF A WIRELESS ACCESS POINT

(71) Applicant: Wayport, Inc., Austin, TX (US)

(72) Inventor: Brett B. Stewart, Austin, TX (US)

(73) Assignee: Wayport, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/905,999

(22) Filed: May 30, 2013

(65) Prior Publication Data

US 2013/0262164 A1  Oct. 3, 2013

Related U.S. Application Data

(60) Continuation of application No. 11/391,631, filed on Mar. 27, 2006, now Pat. No. 8,478,887, which is a (Continued)

(51) Int. Cl.
*G06F 15/173* (2006.01)
*G06F 15/16* (2006.01)
(Continued)

(52) U.S. Cl.
CPC ........ *G06Q 30/0261* (2013.01); *G06Q 30/0255* (2013.01); *H04W 88/08* (2013.01); *H04W 4/00* (2013.01); *G06Q 10/109* (2013.01); *G06Q 10/107* (2013.01); *H04M 15/8033* (2013.01); *H04M 2215/7435* (2013.01); *G06Q 30/0254* (2013.01); *H04W 8/26* (2013.01); *G06Q 30/0267* (2013.01); *H04W 48/08* (2013.01); *G06Q 30/0277* (2013.01); *H04W 4/02* (2013.01); *G06Q 30/02* (2013.01); *G01S 5/02* (2013.01); *H04L 67/18* (2013.01); *H04W 64/00* (2013.01); *H04W 48/16* (2013.01); *H04L 67/12* (2013.01); *H04L 29/06* (2013.01)
USPC ............ 709/225; 709/224; 709/228; 709/229

(58) Field of Classification Search
CPC ......... H04L 67/18; H04L 67/12; H04L 29/06; H04W 64/00; H04W 48/16; H04W 4/02; G06Q 30/0255
USPC .......... 709/224, 225, 228, 229; 342/457, 463, 342/464
See application file for complete search history.

(56) References Cited

U.S. PATENT DOCUMENTS 3,636,421 A   1/1972   Takeishi et al.
4,021,780 A   5/1977   Narey et al.
(Continued)

OTHER PUBLICATIONS

Azuma, Ronald, Tracking Requirements for Augmented Reality, Communications of the ACM, vol. 36 No. 7, Jul. 1993, ACM Press, New York, NY, pp. 50-51.

(Continued)

*Primary Examiner* — Hieu Hoang
(74) *Attorney, Agent, or Firm* — Toler Law Group, PC

(57) ABSTRACT

A method includes receiving, at an information provider, identification information of a portable computing device from a wireless access point. The method includes determining, at the information provider, a service, a product, or both, to be potentially used by a user of the portable computing device. The service, the product, or both, is determined based on a prior user preference of the user. The prior user preference is obtained from a user profile identified based on the identification information. The method includes selecting, at the information provider, an advertisement associated with a business. The advertisement is selected based on the service, the product, or both, to be potentially used by the user and based on a geographic location of the wireless access point.

20 Claims, 2 Drawing Sheets

Related U.S. Application Data continuation of application No. 10/776,293, filed on Feb. 11, 2004, now Pat. No. 8,417,763, which is a continuation of application No. 09/755,649, filed on Jan. 5, 2001, now Pat. No. 6,697,018, which is a division of application No. 09/382,551, filed on Aug. 25, 1999, now Pat. No. 6,326,918, which is a continuation of application No. 09/186,131, filed on Nov. 4, 1998, now Pat. No. 5,969,678, which is a continuation of application No. 08/470,004, filed on Jun. 6, 1995, now Pat. No. 5,835,061.

(51) Int. Cl.

| | |
|---|---|
| *G06Q 30/02* | (2012.01) |
| *G06Q 10/10* | (2012.01) |
| *H04M 15/00* | (2006.01) |
| *H04W 4/02* | (2009.01) |
| *H04L 29/08* | (2006.01) |
| *H04W 64/00* | (2009.01) |
| *H04L 29/06* | (2006.01) |
| *H04W 88/08* | (2009.01) |
| *H04W 4/00* | (2009.01) |
| *H04W 8/26* | (2009.01) |
| *H04W 48/08* | (2009.01) |
| *G01S 5/02* | (2010.01) |
| *H04W 48/16* | (2009.01) |

(56) References Cited

U.S. PATENT DOCUMENTS

| Patent No. | | Date | Inventor(s) | Ref |
|---|---|---|---|---|
| 4,255,619 A | | 3/1981 | Saito | |
| 4,445,118 A | | 4/1984 | Taylor et al. | |
| 4,536,647 A | | 8/1985 | Atalla et al. | |
| 4,757,267 A | | 7/1988 | Riskin | |
| 4,841,560 A | | 6/1989 | Chan et al. | |
| 4,845,504 A | | 7/1989 | Roberts et al. | |
| 4,922,516 A | | 5/1990 | Butler et al. | |
| 4,973,952 A | * | 11/1990 | Malec et al. | 340/5.91 |
| 4,974,170 A | | 11/1990 | Bouve et al. | |
| 4,977,399 A | | 12/1990 | Price et al. | |
| 5,089,814 A | | 2/1992 | DeLuca et al. | |
| 5,095,532 A | | 3/1992 | Mardus | |
| 5,121,126 A | | 6/1992 | Clagett | |
| 5,122,795 A | | 6/1992 | Cubley et al. | |
| 5,131,020 A | | 7/1992 | Liebesny et al. | |
| 5,185,857 A | | 2/1993 | Rozmanith et al. | |
| 5,214,793 A | | 5/1993 | Conway et al. | |
| 5,223,844 A | | 6/1993 | Mansell et al. | |
| 5,243,652 A | | 9/1993 | Teare et al. | |
| 5,245,608 A | | 9/1993 | Deaton et al. | |
| 5,264,822 A | | 11/1993 | Vogelman et al. | |
| 5,265,070 A | | 11/1993 | Minowa | |
| 5,303,393 A | | 4/1994 | Noreen et al. | |
| 5,315,636 A | * | 5/1994 | Patel | 379/201.07 |
| 5,321,242 A | | 6/1994 | Heath, Jr. | |
| 5,337,044 A | * | 8/1994 | Folger et al. | 340/7.1 |
| 5,347,632 A | | 9/1994 | Filepp et al. | |
| 5,361,091 A | * | 11/1994 | Hoarty et al. | 725/119 |
| 5,363,245 A | | 11/1994 | Borello | |
| 5,363,377 A | | 11/1994 | Sharpe | |
| 5,365,516 A | | 11/1994 | Jandrell | |
| 5,371,794 A | | 12/1994 | Diffie et al. | |
| 5,389,773 A | | 2/1995 | Coutts et al. | |
| 5,390,237 A | * | 2/1995 | Hoffman et al. | 379/88.23 |
| 5,404,505 A | | 4/1995 | Levinson | |
| 5,432,841 A | * | 7/1995 | Rimer | 455/457 |
| 5,444,444 A | | 8/1995 | Ross | |
| 5,451,757 A | | 9/1995 | Heath, Jr. | |
| 5,455,807 A | * | 10/1995 | Nepple et al. | 368/47 |
| 5,461,627 A | | 10/1995 | Rypinski | |
| 5,464,822 A | | 11/1995 | Christophers et al. | |
| 5,475,735 A | | 12/1995 | Williams et al. | |
| 5,485,163 A | * | 1/1996 | Singer et al. | 342/457 |
| 5,487,103 A | | 1/1996 | Richardson, Jr. et al. | |
| 5,493,309 A | | 2/1996 | Bjornholt | |
| 5,497,414 A | | 3/1996 | Bartholomew | |
| 5,504,482 A | | 4/1996 | Schreder | |
| 5,511,111 A | | 4/1996 | Serbetcioglu et al. | |
| 5,511,233 A | | 4/1996 | Otten | |
| 5,512,908 A | | 4/1996 | Herrick | |
| 5,513,263 A | | 4/1996 | White et al. | |
| 5,519,760 A | * | 5/1996 | Borkowski et al. | 455/404.2 |
| 5,528,248 A | | 6/1996 | Steiner et al. | |
| 5,539,395 A | | 7/1996 | Buss et al. | |
| 5,544,354 A | * | 8/1996 | May et al. | 1/1 |
| 5,559,520 A | | 9/1996 | Barzegar et al. | |
| 5,561,704 A | * | 10/1996 | Salimando | 455/456.5 |
| 5,566,235 A | | 10/1996 | Hetz | |
| 5,570,412 A | * | 10/1996 | LeBlanc | 455/456.2 |
| 5,570,555 A | | 11/1996 | Ferguson et al. | |
| 5,581,479 A | | 12/1996 | McLaughlin et al. | |
| 5,583,864 A | | 12/1996 | Lightfoot et al. | |
| 5,586,254 A | * | 12/1996 | Kondo et al. | 714/25 |
| 5,588,042 A | | 12/1996 | Comer | |
| 5,590,196 A | | 12/1996 | Moreau | |
| 5,590,398 A | | 12/1996 | Matthews | |
| 5,592,470 A | | 1/1997 | Rudrapatna et al. | |
| 5,594,779 A | | 1/1997 | Goodman | |
| 5,596,625 A | * | 1/1997 | LeBlanc | 455/404.2 |
| 5,602,843 A | | 2/1997 | Gray | |
| 5,608,854 A | * | 3/1997 | Labedz et al. | 345/441 |
| 5,610,973 A | | 3/1997 | Comer | |
| 5,625,364 A | | 4/1997 | Herrick et al. | |
| 5,625,668 A | | 4/1997 | Loomis et al. | |
| 5,627,549 A | | 5/1997 | Park | |
| 5,636,245 A | | 6/1997 | Ernst et al. | |
| 5,646,632 A | | 7/1997 | Khan et al. | |
| 5,654,959 A | | 8/1997 | Baker et al. | |
| 5,657,375 A | | 8/1997 | Connolly et al. | |
| 5,661,492 A | | 8/1997 | Shoap et al. | |
| 5,663,734 A | | 9/1997 | Krasner | |
| 5,664,948 A | * | 9/1997 | Dimitriadis et al. | 434/307 R |
| 5,666,481 A | | 9/1997 | Lewis | |
| 5,670,964 A | | 9/1997 | Dent | |
| 5,677,905 A | | 10/1997 | Bigham et al. | |
| 5,687,212 A | | 11/1997 | Kinser, Jr. et al. | |
| 5,689,431 A | | 11/1997 | Rudow et al. | |
| 5,694,453 A | | 12/1997 | Fuller et al. | |
| 5,701,301 A | | 12/1997 | Weisser, Jr. | |
| 5,704,049 A | | 12/1997 | Briechle | |
| 5,712,899 A | | 1/1998 | Pace, II | |
| 5,713,075 A | | 1/1998 | Threadgill et al. | |
| 5,714,948 A | | 2/1998 | Farmakis et al. | |
| 5,717,688 A | | 2/1998 | Belanger et al. | |
| 5,720,033 A | | 2/1998 | Deo | |
| 5,724,521 A | | 3/1998 | Dedrick | |
| 5,727,057 A | | 3/1998 | Emery et al. | |
| 5,729,680 A | | 3/1998 | Belanger et al. | |
| 5,742,509 A | * | 4/1998 | Goldberg et al. | 701/517 |
| 5,771,283 A | | 6/1998 | Chang et al. | |
| 5,774,534 A | | 6/1998 | Mayer | |
| 5,777,580 A | * | 7/1998 | Janky et al. | 342/457 |
| 5,778,304 A | | 7/1998 | Grube et al. | |
| 5,790,974 A | | 8/1998 | Tognazzini | |
| 5,794,210 A | | 8/1998 | Goldhaber et al. | |
| 5,796,727 A | | 8/1998 | Harrison et al. | |
| 5,798,733 A | | 8/1998 | Ethridge | |
| 5,806,018 A | * | 9/1998 | Smith et al. | 701/538 |
| 5,812,763 A | | 9/1998 | Teng | |
| 5,819,155 A | | 10/1998 | Worthy et al. | |
| 5,826,195 A | | 10/1998 | Westerlage et al. | |
| 5,835,061 A | | 11/1998 | Stewart | |
| 5,838,774 A | | 11/1998 | Weisser, Jr. | |
| 5,842,010 A | * | 11/1998 | Jain et al. | 348/14.02 |
| 5,845,211 A | * | 12/1998 | Roach, Jr. | 455/436 |
| 5,852,775 A | | 12/1998 | Hidary | |
| 5,855,007 A | | 12/1998 | Jovicic et al. | |
| 5,870,555 A | | 2/1999 | Pruet et al. | |
| 5,870,724 A | | 2/1999 | Lawlor et al. | |
| 5,875,186 A | | 2/1999 | Belanger et al. | |
| 5,875,401 A | | 2/1999 | Rochkind | |

(56) References Cited

U.S. PATENT DOCUMENTS

| | | | |
|---|---|---|---|
| 5,878,126 A | 3/1999 | Velamuri et al. |
| 5,880,958 A | 3/1999 | Helms et al. |
| 5,881,131 A | 3/1999 | Farris et al. |
| 5,884,284 A | 3/1999 | Peters et al. |
| 5,887,259 A | 3/1999 | Zicker et al. |
| 5,889,953 A | 3/1999 | Thebaut et al. |
| 5,892,454 A | 4/1999 | Schipper et al. |
| 5,896,440 A | 4/1999 | Reed et al. |
| 5,897,640 A | 4/1999 | Veghte et al. |
| 5,903,454 A | 5/1999 | Hoffberg et al. |
| 5,903,636 A | 5/1999 | Malik |
| 5,907,544 A | 5/1999 | Rypinski |
| 5,920,846 A | 7/1999 | Storch et al. |
| 5,922,040 A | 7/1999 | Prabhakaran |
| 5,923,702 A | 7/1999 | Brenner et al. |
| 5,933,420 A | 8/1999 | Jaszewski et al. |
| 5,938,721 A | 8/1999 | Dussell et al. |
| 5,949,867 A | 9/1999 | Sonnenberg |
| 5,950,130 A | 9/1999 | Coursey |
| 5,961,593 A | 10/1999 | Gabber et al. |
| 5,963,866 A | 10/1999 | Palamara et al. |
| 5,963,913 A | 10/1999 | Henneuse et al. |
| 5,968,176 A | 10/1999 | Nessett et al. |
| 5,969,678 A | 10/1999 | Stewart |
| 5,982,867 A | 11/1999 | Urban et al. |
| 5,983,091 A | 11/1999 | Rodriguez |
| 5,987,381 A | 11/1999 | Oshizawa |
| 5,991,287 A | 11/1999 | Diepstraten et al. |
| 5,995,015 A | 11/1999 | DeTemple et al. |
| 6,006,090 A | 12/1999 | Coleman et al. |
| 6,009,398 A | 12/1999 | Mueller et al. |
| 6,011,975 A | 1/2000 | Emery et al. |
| 6,018,293 A | 1/2000 | Smith |
| 6,018,726 A | 1/2000 | Tsumura |
| 6,026,151 A | 2/2000 | Bauer et al. |
| 6,028,921 A | 2/2000 | Malik et al. |
| 6,047,327 A | 4/2000 | Tso et al. |
| 6,055,637 A | 4/2000 | Hudson et al. |
| 6,058,106 A | 5/2000 | Cudak et al. |
| 6,067,082 A | 5/2000 | Enmei |
| 6,067,297 A | 5/2000 | Beach |
| 6,076,080 A | 6/2000 | Morscheck et al. |
| 6,085,086 A | 7/2000 | La Porta et al. |
| 6,091,956 A | 7/2000 | Hollenberg |
| 6,101,381 A | 8/2000 | Tajima et al. |
| 6,101,443 A | 8/2000 | Kato et al. |
| 6,112,186 A | 8/2000 | Bergh et al. |
| 6,115,669 A | 9/2000 | Watanabe et al. |
| 6,122,520 A | 9/2000 | Want et al. |
| 6,133,853 A | 10/2000 | Obradovich et al. |
| 6,138,003 A | 10/2000 | Kingdon et al. |
| 6,138,119 A | 10/2000 | Hall et al. |
| 6,141,609 A | 10/2000 | Herdeg et al. |
| 6,144,645 A | 11/2000 | Struhsaker et al. |
| 6,154,152 A | 11/2000 | Ito |
| 6,154,637 A | 11/2000 | Wright et al. |
| 6,157,829 A | 12/2000 | Grube et al. |
| 6,157,946 A | 12/2000 | Itakura et al. |
| 6,163,274 A | 12/2000 | Lindgren |
| 6,167,255 A | 12/2000 | Kennedy, III et al. |
| 6,182,226 B1 | 1/2001 | Reid et al. |
| 6,184,829 B1 | 2/2001 | Stilp |
| 6,185,426 B1 | 2/2001 | Alperovich et al. |
| 6,185,484 B1 | 2/2001 | Rhinehart |
| 6,192,230 B1 | 2/2001 | VanBokhorst et al. |
| 6,192,314 B1 | 2/2001 | Khavakh et al. |
| 6,202,054 B1 | 3/2001 | Lawlor et al. |
| 6,205,478 B1 | 3/2001 | Sugano et al. |
| 6,208,854 B1 | 3/2001 | Roberts et al. |
| 6,208,866 B1 | 3/2001 | Rouhollahzadeh et al. |
| 6,226,277 B1 | 5/2001 | Chuah |
| 6,229,477 B1 | 5/2001 | Chang et al. |
| 6,229,810 B1 | 5/2001 | Gerszberg et al. |
| 6,233,329 B1 | 5/2001 | Urban et al. |
| 6,233,452 B1 | 5/2001 | Nishino |
| 6,236,360 B1 | 5/2001 | Rudow et al. |
| 6,236,940 B1 | 5/2001 | Rudow et al. |
| 6,246,361 B1 | 6/2001 | Weill et al. |
| 6,259,405 B1 | 7/2001 | Stewart et al. |
| 6,263,209 B1 | 7/2001 | Reed et al. |
| 6,278,938 B1 | 8/2001 | Alumbaugh |
| 6,285,665 B1 | 9/2001 | Chuah |
| 6,285,931 B1 | 9/2001 | Hattori et al. |
| 6,298,234 B1 | 10/2001 | Brunner |
| 6,308,273 B1 | 10/2001 | Goertzel et al. |
| 6,311,069 B1 | 10/2001 | Havinis et al. |
| 6,317,718 B1 | 11/2001 | Fano |
| 6,321,092 B1 | 11/2001 | Fitch et al. |
| 6,324,396 B1 | 11/2001 | Vasa et al. |
| 6,326,918 B1 | 12/2001 | Stewart |
| 6,327,254 B1 | 12/2001 | Chuah |
| 6,327,357 B1 | 12/2001 | Meek et al. |
| 6,332,127 B1 | 12/2001 | Bandera et al. |
| 6,332,163 B1 | 12/2001 | Bowman-Amuah |
| 6,340,958 B1 | 1/2002 | Cantu et al. |
| 6,343,290 B1 | 1/2002 | Cossins et al. |
| 6,353,664 B1 | 3/2002 | Cannon et al. |
| 6,359,880 B1 | 3/2002 | Curry et al. |
| 6,360,101 B1 | 3/2002 | Irvin |
| 6,363,421 B2 | 3/2002 | Barker et al. |
| 6,366,561 B1 | 4/2002 | Bender |
| 6,377,548 B1 | 4/2002 | Chuah |
| 6,377,810 B1 | 4/2002 | Geiger et al. |
| 6,377,982 B1 | 4/2002 | Rai et al. |
| 6,385,531 B2 | 5/2002 | Bates et al. |
| 6,385,591 B1 | 5/2002 | Mankoff |
| 6,389,426 B1 | 5/2002 | Turnbull et al. |
| 6,393,482 B1 | 5/2002 | Rai et al. |
| 6,400,722 B1 | 6/2002 | Chuah et al. |
| 6,407,673 B1 | 6/2002 | Lane |
| 6,408,307 B1 | 6/2002 | Semple et al. |
| 6,414,635 B1 | 7/2002 | Stewart et al. |
| 6,414,950 B1 | 7/2002 | Rai et al. |
| 6,415,019 B1 | 7/2002 | Savaglio et al. |
| 6,418,308 B1 | 7/2002 | Heinonen et al. |
| 6,421,441 B1 | 7/2002 | Dzuban |
| 6,421,714 B1 | 7/2002 | Rai et al. |
| 6,427,073 B1 | 7/2002 | Kortelsalmi et al. |
| 6,427,119 B1 | 7/2002 | Stefan et al. |
| 6,430,276 B1 | 8/2002 | Bouvier et al. |
| 6,430,562 B1 | 8/2002 | Kardos et al. |
| 6,442,391 B1 | 8/2002 | Johansson et al. |
| 6,442,479 B1 | 8/2002 | Barton |
| 6,442,687 B1 | 8/2002 | Savage |
| 6,449,272 B1 | 9/2002 | Chuah et al. |
| 6,449,497 B1 | 9/2002 | Kirbas et al. |
| 6,452,498 B2 | 9/2002 | Stewart |
| 6,463,533 B1 | 10/2002 | Calamera et al. |
| 6,470,378 B1 | 10/2002 | Tracton et al. |
| 6,470,447 B1 | 10/2002 | Lambert et al. |
| 6,473,626 B1 | 10/2002 | Nevoux et al. |
| 6,477,382 B1 | 11/2002 | Mansfield et al. |
| 6,477,526 B2 | 11/2002 | Hayashi et al. |
| 6,484,029 B2 | 11/2002 | Hughes et al. |
| 6,484,092 B2 | 11/2002 | Seibel |
| 6,484,148 B1 | 11/2002 | Boyd |
| 6,490,291 B1 | 12/2002 | Lee et al. |
| 6,496,491 B2 | 12/2002 | Chuah et al. |
| 6,496,931 B2 | 12/2002 | Rajchel et al. |
| 6,505,046 B1 | 1/2003 | Baker |
| 6,505,048 B1 | 1/2003 | Moles et al. |
| 6,505,049 B1 | 1/2003 | Dorenbosch |
| 6,505,120 B2 | 1/2003 | Yamashita et al. |
| 6,505,163 B1 | 1/2003 | Zhang et al. |
| 6,512,754 B2 | 1/2003 | Feder et al. |
| 6,516,055 B1 | 2/2003 | Bedeski et al. |
| 6,516,416 B2 | 2/2003 | Gregg et al. |
| 6,519,252 B2 | 2/2003 | Sallberg |
| 6,519,458 B2 | 2/2003 | Oh et al. |
| 6,522,876 B1 | 2/2003 | Weiland et al. |
| 6,526,275 B1 | 2/2003 | Calvert |
| 6,526,349 B2 | 2/2003 | Bullock et al. |
| 6,532,418 B2 | 3/2003 | Chun et al. |
| 6,545,596 B1 | 4/2003 | Moon |

(56) References Cited

U.S. PATENT DOCUMENTS

| | | |
|---|---|---|
| 6,546,257 B1 | 4/2003 | Stewart |
| 6,560,442 B1 | 5/2003 | Yost et al. |
| 6,560,461 B1 | 5/2003 | Fomukong et al. |
| 6,577,643 B1 | 6/2003 | Rai et al. |
| 6,577,644 B1 | 6/2003 | Chuah et al. |
| 6,594,482 B1 | 7/2003 | Findikli et al. |
| 6,618,474 B1 | 9/2003 | Reese |
| 6,618,593 B1 | 9/2003 | Drutman et al. |
| 6,622,016 B1 | 9/2003 | Sladek et al. |
| 6,628,627 B1 | 9/2003 | Zendle et al. |
| 6,628,928 B1 | 9/2003 | Crosby et al. |
| 6,628,938 B1 | 9/2003 | Rachabathuni et al. |
| 6,633,633 B1 | 10/2003 | Bedingfield |
| 6,640,184 B1 | 10/2003 | Rabe |
| 6,647,257 B2 | 11/2003 | Owensby |
| 6,647,269 B2 | 11/2003 | Hendrey et al. |
| 6,650,901 B1 | 11/2003 | Schuster et al. |
| 6,654,610 B1 | 11/2003 | Chen et al. |
| 6,662,014 B1 | 12/2003 | Walsh |
| 6,665,536 B1 | 12/2003 | Mahany |
| 6,665,718 B1 | 12/2003 | Chuah et al. |
| 6,671,272 B2 | 12/2003 | Vaziri et al. |
| 6,675,017 B1 | 1/2004 | Zellner et al. |
| 6,675,208 B1 | 1/2004 | Rai et al. |
| 6,677,894 B2 | 1/2004 | Sheynblat et al. |
| 6,697,018 B2 | 2/2004 | Stewart |
| 6,697,783 B1 | 2/2004 | Brinkman et al. |
| 6,701,160 B1 | 3/2004 | Pinder et al. |
| 6,701,251 B2 | 3/2004 | Stefan et al. |
| 6,704,311 B1 | 3/2004 | Chuah et al. |
| 6,716,101 B1 | 4/2004 | Meadows et al. |
| 6,721,406 B1 | 4/2004 | Contractor |
| 6,725,048 B2 | 4/2004 | Mao et al. |
| 6,732,080 B1 | 5/2004 | Blants |
| 6,732,101 B1 | 5/2004 | Cook |
| 6,732,176 B1 | 5/2004 | Stewart et al. |
| 6,738,808 B1 | 5/2004 | Zellner et al. |
| 6,754,504 B1 | 6/2004 | Reed |
| 6,754,582 B1 | 6/2004 | Smith et al. |
| 6,759,960 B2 | 7/2004 | Stewart |
| 6,772,064 B1 | 8/2004 | Smith et al. |
| 6,799,049 B1 | 9/2004 | Zellner et al. |
| 6,801,509 B1 | 10/2004 | Chuah et al. |
| 6,816,720 B2 | 11/2004 | Hussain et al. |
| 6,819,929 B2 | 11/2004 | Antonucci et al. |
| 6,820,053 B1 | 11/2004 | Ruwisch |
| 6,820,062 B1 | 11/2004 | Gupta et al. |
| 6,829,475 B1 | 12/2004 | Lee et al. |
| 6,850,758 B1 | 2/2005 | Paul et al. |
| 6,867,733 B2 | 3/2005 | Sandhu et al. |
| 6,868,074 B1 | 3/2005 | Hanson |
| 6,874,011 B1 | 3/2005 | Spielman et al. |
| 6,876,858 B1 | 4/2005 | Duvall et al. |
| 6,898,569 B1 | 5/2005 | Bansal et al. |
| 6,937,869 B1 | 8/2005 | Rayburn |
| 6,937,998 B1 | 8/2005 | Swartz et al. |
| 6,954,147 B1 | 10/2005 | Cromer et al. |
| 6,985,747 B2 | 1/2006 | Chithambaram |
| 6,999,572 B1 | 2/2006 | Shaffer et al. |
| 7,005,985 B1 | 2/2006 | Steeves |
| 7,009,556 B2 | 3/2006 | Stewart |
| 7,023,995 B2 | 4/2006 | Olsson |
| 7,043,231 B2 | 5/2006 | Bhatia et al. |
| 7,058,594 B2 | 6/2006 | Stewart |
| 7,069,319 B2 | 6/2006 | Zellner et al. |
| 7,085,555 B2 | 8/2006 | Zellner et al. |
| 7,103,368 B2 | 9/2006 | Teshima |
| 7,103,476 B2 | 9/2006 | Smith et al. |
| 7,106,843 B1 | 9/2006 | Gainsboro et al. |
| 7,110,749 B2 | 9/2006 | Zellner et al. |
| 7,116,977 B1 | 10/2006 | Moton, Jr. et al. |
| 7,124,101 B1 | 10/2006 | Mikurak |
| 7,130,630 B1 | 10/2006 | Enzmann et al. |
| 7,139,722 B2 | 11/2006 | Perrella et al. |
| 7,155,199 B2 | 12/2006 | Zalewski et al. |
| 7,181,225 B1 | 2/2007 | Moton, Jr. et al. |
| 7,181,529 B2 | 2/2007 | Bhatia et al. |
| 7,188,027 B2 | 3/2007 | Smith et al. |
| 7,190,960 B2 | 3/2007 | Wilson et al. |
| 7,203,502 B2 | 4/2007 | Wilson et al. |
| 7,212,829 B1 | 5/2007 | Lau et al. |
| 7,224,978 B2 | 5/2007 | Zellner et al. |
| 7,236,799 B2 | 6/2007 | Wilson et al. |
| RE39,717 E | 7/2007 | Yates et al. |
| 7,245,925 B2 | 7/2007 | Zellner |
| 7,260,378 B2 | 8/2007 | Holland et al. |
| 7,272,493 B1 | 9/2007 | Hamrick et al. |
| 7,292,939 B2 | 11/2007 | Smith et al. |
| 7,295,924 B2 | 11/2007 | Smith et al. |
| 7,362,851 B2 | 4/2008 | Contractor |
| 7,383,052 B2 | 6/2008 | Moton, Jr. et al. |
| 8,095,647 B2 | 1/2012 | Stewart |
| 8,199,733 B2 | 6/2012 | Stewart |
| 8,250,204 B2 | 8/2012 | Stewart |
| 8,391,265 B2 | 3/2013 | Stewart |
| 2001/0001239 A1 | 5/2001 | Stewart |
| 2001/0007450 A1 | 7/2001 | Begum |
| 2001/0021646 A1 | 9/2001 | Antonucci et al. |
| 2001/0028301 A1 | 10/2001 | Geiger et al. |
| 2001/0034709 A1 | 10/2001 | Stoifo et al. |
| 2001/0049275 A1 | 12/2001 | Pierry et al. |
| 2001/0051911 A1 | 12/2001 | Marks et al. |
| 2002/0035474 A1 | 3/2002 | Alpdemir |
| 2002/0037709 A1 | 3/2002 | Bhatia et al. |
| 2002/0037722 A1 | 3/2002 | Hussain et al. |
| 2002/0037731 A1 | 3/2002 | Mao et al. |
| 2002/0037744 A1 | 3/2002 | Bhatia et al. |
| 2002/0037750 A1 | 3/2002 | Hussain et al. |
| 2002/0038362 A1 | 3/2002 | Bhatia et al. |
| 2002/0038384 A1 | 3/2002 | Khan et al. |
| 2002/0038386 A1 | 3/2002 | Bhatia et al. |
| 2002/0046090 A1 | 4/2002 | Stewart |
| 2002/0052781 A1 | 5/2002 | Aufricht et al. |
| 2002/0077083 A1 | 6/2002 | Zellner et al. |
| 2002/0077084 A1 | 6/2002 | Zellner et al. |
| 2002/0077118 A1 | 6/2002 | Zellner et al. |
| 2002/0077130 A1 | 6/2002 | Owensby |
| 2002/0077897 A1 | 6/2002 | Zellner et al. |
| 2002/0087335 A1 | 7/2002 | Meyers et al. |
| 2002/0090932 A1 | 7/2002 | Bhatia et al. |
| 2002/0095312 A1 | 7/2002 | Wheat |
| 2002/0102993 A1 | 8/2002 | Hendrey et al. |
| 2002/0107027 A1 | 8/2002 | O'Neil |
| 2002/0120713 A1 | 8/2002 | Gupta et al. |
| 2002/0161637 A1 | 10/2002 | Sugaya |
| 2002/0174147 A1 | 11/2002 | Wang et al. |
| 2003/0003990 A1 | 1/2003 | Von Kohorn |
| 2003/0016233 A1 | 1/2003 | Charpentier |
| 2003/0018527 A1 | 1/2003 | Filepp et al. |
| 2003/0140088 A1 | 7/2003 | Robinson et al. |
| 2003/0169151 A1 | 9/2003 | Ebling et al. |
| 2004/0002329 A1 | 1/2004 | Bhatia et al. |
| 2004/0097243 A1 | 5/2004 | Zellner et al. |
| 2004/0111269 A1 | 6/2004 | Koch |
| 2004/0164898 A1 | 8/2004 | Stewart |
| 2004/0186902 A1 | 9/2004 | Stewart |
| 2004/0203903 A1 | 10/2004 | Wilson et al. |
| 2004/0205198 A1 | 10/2004 | Zellner et al. |
| 2004/0266453 A1 | 12/2004 | Maanoja et al. |
| 2005/0017068 A1 | 1/2005 | Zalewski et al. |
| 2005/0043036 A1 | 2/2005 | Ioppe et al. |
| 2005/0060365 A1 | 3/2005 | Robinson et al. |
| 2005/0096067 A1 | 5/2005 | Martin |
| 2005/0114777 A1 | 5/2005 | Szeto |
| 2005/0151655 A1 | 7/2005 | Hamrick et al. |
| 2005/0246097 A1 | 11/2005 | Hamrick et al. |
| 2005/0272445 A1 | 12/2005 | Zellner |
| 2006/0030335 A1 | 2/2006 | Zellner et al. |
| 2006/0030339 A1 | 2/2006 | Zhovnirovsky et al. |
| 2006/0059043 A1 | 3/2006 | Chan et al. |
| 2006/0089134 A1 | 4/2006 | Moton, Jr. et al. |
| 2006/0094447 A1 | 5/2006 | Zellner |
| 2006/0099966 A1 | 5/2006 | Moton, Jr. et al. |
| 2006/0105784 A1 | 5/2006 | Zellner et al. |

(56) References Cited

U.S. PATENT DOCUMENTS

| | | |
|---|---|---|
| 2006/0106537 A1 | 5/2006 | Hamrick et al. |
| 2006/0164302 A1 | 7/2006 | Stewart |
| 2006/0167986 A1 | 7/2006 | Trzyna et al. |
| 2006/0183467 A1 | 8/2006 | Stewart |
| 2006/0189327 A1 | 8/2006 | Zellner et al. |
| 2006/0189332 A1 | 8/2006 | Benco et al. |
| 2006/0195570 A1 | 8/2006 | Zellner et al. |
| 2006/0253252 A1 | 11/2006 | Hamrick et al. |
| 2007/0010260 A1 | 1/2007 | Zellner |
| 2007/0042789 A1 | 2/2007 | Moton, Jr. et al. |
| 2007/0105565 A1 | 5/2007 | Enzmann et al. |
| 2007/0124721 A1 | 5/2007 | Cowing et al. |
| 2007/0136603 A1 | 6/2007 | Kuecuekyan |
| 2007/0250920 A1 | 10/2007 | Lindsay |
| 2008/0045241 A1 | 2/2008 | Stewart |
| 2008/0051108 A1 | 2/2008 | Stewart |
| 2008/0057924 A1 | 3/2008 | Stewart |
| 2008/0096529 A1 | 4/2008 | Zellner |
| 2012/0078723 A1 | 3/2012 | Stewart |
| 2012/0284066 A1 | 11/2012 | Stewart |
| 2013/0036010 A1 | 2/2013 | Stewart |

OTHER PUBLICATIONS

Chen, Harry et al. Dynamic Service Discovery for Mobile Computing: Intelligent Agents Meet Jini in the Aether, Cluster Computing, Special Issue on Internet Scalability, vol. 4, Issue 4, Oct. 2001, Springer Science + Business Media, New York, NY, pp. 343-354.

Dingus, Thomas A. et al., Human Factors Engineering the TravTek Driver Interface, Vehicle Navigation and Information Systems Conference Proceedings, Part II, Oct. 1991, Society of Automotive Engineers, Incorporated, Warrendale, PA, pp. 749-755.

Egenhofer, Max J., Spatial SQL: A Query and Presentation Language, IEEE Transactions on Knowledge and Data Engineering, vol. 6, No. 1, Feb. 1994, IEEE Educational Activities Department, Piscataway, NJ, pp. 86-95.

Fitzmaurice, George W., Situated Information Spaces and Spatially Aware Palmtop Computers, Communication of the ACM, vol. 36, No. 7, Jul. 1993, ACM Press, New York, NY, pp. 39-49.

Harter, Andy et al., A Distributed Location System for the Active Office, IEEE Network, Jan./Feb. 1994, IEEE Communications Society, New York, NY, pp. 62-70.

Muffat, Michel et al., European Cooperation on Dual Mode Route Guidance-Perspectives for Advanced Research Partners, Vehicle Navigation and Information Systems Conference Proceedings, Part II, Oct. 1991, Soc. of Automotive Engineers, Inc., Warrendale, PA, pp. 929-935.

Phail, Fred, The Power of a Personal Computer for Car Information and Communications Systems, Vehicle Navigation and Information Systems Conference Proceedings, Part 1, Oct. 1991, Society of Automotive Engineers, Inc., Warrendale, PA, pp. 389-395.

Schilit, Bill N. et al., Disseminating Active Map Information to Mobile Hosts, IEEE Network, Sep./Oct. 1994, IEEE Communications Society, New York, NY, pp. 22-32.

Spreitzer, Mike et al., Providing Location Information in a Ubiquitous Computing Environment, Proceedings of the Fourteenth ACM Symposium on Operating Systems Principles, Dec. 1993, ACM Press, New York, NY, pp. 270-283.

Want, Roy et al., The Active Badge Location System, ACM Transactions on Information Systems, vol. 10, No. 1, Jan. 1992, ACM Press, New York, NY, pp. 91-102.

White, Marvin, Emerging Requirements for Digital Maps for In-Vehicle Pathfinding and Other Traveller Assistance, Vehicle Navigation and Information Systems Conference Proceedings, Part 1, Oct. 1991, Society of Automotive Engineers, Inc., Warrendale, PA, pp. 179-184.

* cited by examiner

PROVIDING AN ADVERTISEMENT BASED ON A GEOGRAPHIC LOCATION OF A WIRELESS ACCESS POINT

PRIORITY CLAIM

This application is a continuation of, and claims priority to, U.S. patent application Ser. No. 11/391,631, filed on Mar. 27, 2006, which is a continuation of U.S. patent application Ser. No. 10/776,293, filed on Feb. 11, 2004, now issued as U.S. Pat. No. 8,417,763, which is a continuation of Ser. No. 09/755,649, now issued as U.S. Pat. No. 6,697,018, which is a divisional of U.S. patent application Ser. No. 09/382,551, filed on Aug. 25, 1999, now issued as U.S. Pat. No. 6,326,918, which is a continuation of U.S. patent application Ser. No. 09/186,131, filed on Nov. 4, 1998, now issued as U.S. Pat. No. 5,969,678, which is a continuation of U.S. patent application Ser. No. 08/470,004, filed on Jun. 6, 1995, now issued as U.S. Pat. No. 5,835,061, each of which is hereby incorporated by reference in its entirety.

FIELD OF THE DISCLOSURE

This disclosure generally relates to a geographic-based communications service and, more particularly, to an apparatus and method for using known locations of wireless local area network access points (APs) to service mobile users (MUs) of portable smart devices (e.g., notebooks, personal computers, personal digital assistants (PDAs), etc.) that are in the vicinity of these APs.

BACKGROUND

As technology improvements result in smaller, lighter and more portable computing devices, a wide variety of new applications and users will emerge. Users will not only operate such devices in stand-alone mode, but with portability, users will also require the ability to send and receive information through such devices at any location. The need to communicate will arise in circumstances where hard wired links may not be readily available or practical or when the user of the portable computing device cannot be reached immediately. Moreover, a result of user mobility is that the precise location of the user is often variable or not determined. Conventional communications systems for computing devices are not equipped to handle such communication scenarios.

Commercially available personal computers or other similar devices are generally equipped with industry standard interface ports for driving a peripheral device such as a printer, a plotter, or a modem. While operating in an unknown, remote location not connected to a network, the portable personal computer user may be unaware of messages waiting for him. In addition, conventionally, the user must wait until reaching an office or other place with appropriate equipment to receive such messages and to transmit or print documents or other information prepared by the user on his personal device.

By way of example and not limitation, one type of mobile user is a traveler who passes through airports or similar mass transit centers (e.g., subway stations), uses ground transportation and stays in a hotel. In a typical scenario, the traveler may use a personal computer to perform calculations or prepare documents on a personal computing device during an airplane flight. Simultaneously, associates may leave messages for the traveler on a network. In conventional systems, the traveler's work product, and messages destined for the traveler, are not available until the traveler arrives at a location where a wired connection to the traveler's network is available.

A further example of inefficiencies for the traveler concerns travel arrangements themselves. After arriving at an airport, the traveler proceeds to a car rental desk or to some other transportation location. The traveler typically waits in line while the car rental agency inquires about automobile preference, driver's license, method of payment, type of insurance required, etc. Having experienced some delay, the traveler is now on his way to a business location or hotel. Upon arriving at a hotel check-in/registration desk, the traveler often experiences further delay waiting in line and providing the check-in clerk with routine information such as address, length of stay, type of room desired, method of payment, etc. In addition, the business traveler may need to call back to his office to check for telephone messages, thereby incurring further delays.

While accessing databases for information about the traveler, the traveler's preferences and the traveler's requirements can reduce many delays, a common characteristic is that the pending arrival or presence of the traveler is not known to those who can act in advance. Further, conventional systems cannot generally locate a mobile user of a personal computing device and take advantage of that information to reduce the time required to complete routine activities or to provide the user options that can enhance the user's productivity.

In another example, when a user dials a telephone number to an automatic teller machine (ATM) locator, the user is prompted to key in his area code and exchange prefix. The locator system then identifies one or more ATMs within the user's area. However, the system requires the user to call in and cannot locate the user any more accurately than the telephone exchange area. Thus, the mobile user could be advised of an ATM quite a physical distance from the mobile user's location.

SUMMARY

According to the disclosure, mobile users communicate with wireless local area networks within a range of an access point (AP). When a user passes an access point, the access point recognizes the user, and the user's device can then retrieve data (telephone, E-mail messages, etc.) waiting for the user and transmit information (E-mail messages, print documents, requests for information from service providers, etc.) that the user may have for transmission to a desired recipient. For instance, this process could occur as a user exits an airplane and is detected by an access point in an airport.

Accordingly, the present disclosure is directed toward a method and apparatus for using known locations of local area network APs (access points) to service mobile users who are in the vicinity of these APs. Such access points and mobile units typically communicate with each other in a wireless manner. A method according to the disclosure includes the steps of: (a) detecting the presence of a mobile unit in the vicinity of an access point and (b) transmitting/receiving information from the mobile unit to/from the network through the access point.

According to the disclosure, information and services can be provided by various providers connected to the network which are able to respond to unanticipated requests or which have acquired knowledge about the user's requirements, preferences and habits over a period of time and have extrapolated information from the user's past practices for probable future actions consistent with these past actions.

For example, in one application, an access point receives a print job from a user's mobile unit and sends it to a printer available at a destination point designated by the user so that the document is printed and available to the user upon his arrival at his destination. In another application according to the disclosure, upon detecting the arrival of a user's mobile unit at a destination, a message, for example, an E-mail message, is sent to the user's rental car agency. The agency can take appropriate actions so that the user's rental car is ready and the user does not waste time waiting in line. Using a similar approach, a user can be pre-registered at a hotel so that his room is ready upon arrival.

Thus, according to the disclosure, a geographic-based communications service system for mobile users includes a mobile unit for transmitting and receiving information and a plurality of access points connected to a network and arranged at known locations in a geographic region for transmitting the information to and receiving the information from said mobile unit. One of the access points detects the presence of a mobile unit and sends a signal to the network. A plurality of information providers are connected to the network. The network accesses the information providers based on the signal received from a mobile unit via the access points to provide data to the mobile unit or to another entity on behalf of the user of the mobile unit. In particular, the known location of the access point detecting the presence of the mobile unit defines the location of said mobile unit. Based on the location of the mobile unit as detected by the AP, a service provider on the network can take actions appropriate to the user's location, such as notifying a car rental agency of the user's presence or notifying the user of canceled flights and adjustments to the user's itinerary. Further according to the disclosure, clocks in the user's mobile device and event schedules can be updated automatically to correspond to the present time in the time zone where the access point detecting the user's mobile unit is located.

DETAILED DESCRIPTION

Figure 1:
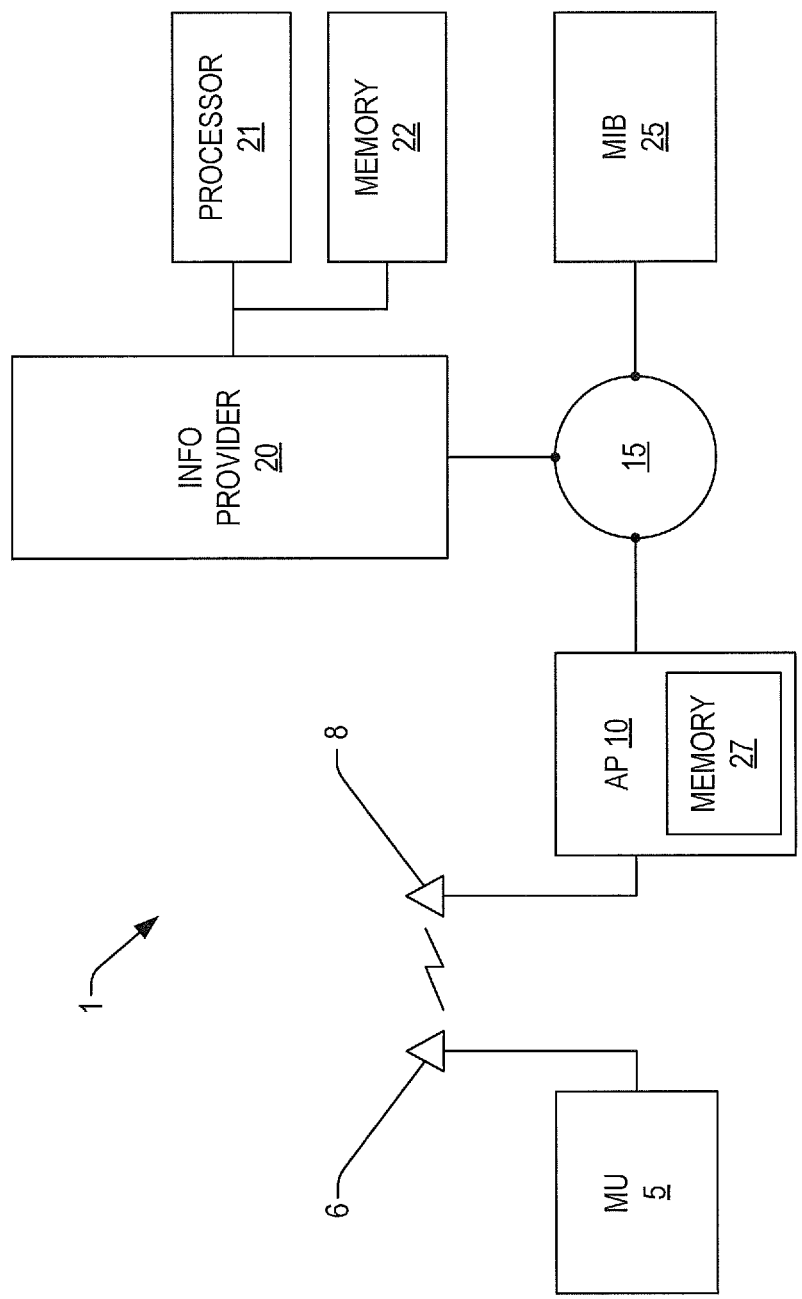
FIG. 1 is a representation of a geographic-based communications service system, according to the disclosure.

FIG. 1 shows a geographic-based communications service system, generally designated 1, according to the disclosure. The system includes a mobile unit (e.g., portable computer) 5, an AP (access point) 10, an information provider 20, a management information base (MIB) 25 and a centralized network 15. The information provider 20 will typically have a processor 21 and memory 22 with controlled access thereto. Typically, access point 10 and mobile unit 5 communicate in a wireless manner. Thus, mobile unit 5 and access point 10 would be equipped with an appropriate transmitter and receiver compatible in power and frequency range to establish such a wireless communication link. In addition, mobile unit 5 would also be equipped with a code generator which generates an identification code that can be transmitted to and recognized by the access point 10 or a system accessed through access point 10. Such an identification code allows recognition of a user before providing access to system services, thereby providing a measure of security and a service billing mechanism.

Figure 2:
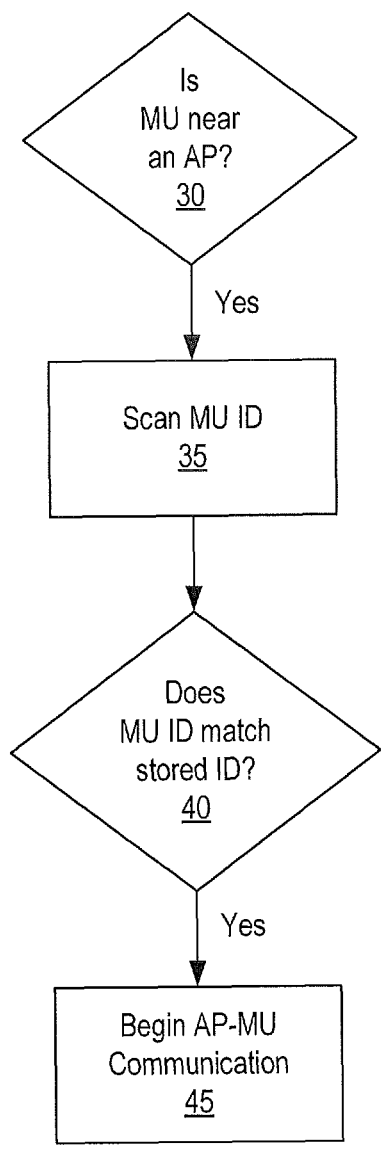
FIG. 2 is a flow chart showing a mobile unit interfacing with an access point, according to the system of FIG. 1.

FIG. 2 is a flow chart showing an implementation of the communication between the mobile unit 5 and an access point 10. In step 30, the access point 10 determines whether the mobile unit 5 is within a range of the access point 10. In steps 35 and 40, the access point 10 scans the mobile unit 5 and determines whether a mobile unit identity (ID) matches a stored ID, and in step 45, the communication between the mobile unit 5 and the access point 10 begins. The communication between mobile unit 5 and access point 10 may include sending and receiving information which may include text, voice data and video data.

As illustrated in FIG. 2 a first step according to the disclosure is establishing a connection between a mobile unit and an access point. Referring again to FIG. 1, the mobile unit 5 can send a beacon signal that is picked up by one of the APs 10 located in a plurality of locations within a geographic region. When the beacon signal is picked up by a particular AP 10, the beacon signal is transmitted back to the management information base (MIB) 25 by AP 10. Since a location of the access point is defined and known by MIB 25, detection of the presence of the mobile unit by an AP 10 allows MIB 25 to know exactly where the mobile user is located at any given time. For example, the MIB could store the latitude, longitude, altitude, and other geographic information such as a local map of the area of each access point.

The precision available in this type of mapping scheme is distinguished from that typically achieved in a cellular telephone system. In a cellular telephone system a user transmits a beacon signal at a fixed frequency. When the user moves from a first "cell" to a second "cell", the receiver located at the midpoint of the first cell no longer picks up the beacon signal, and the receiver located at the midpoint of the second cell picks up the beacon signal. A cellular telephone "handoff" in which the phone call is now under control of the second cell then takes place. It is only possible to locate the user to a relatively large area defined by the cells. There is no provision for locating the user more precisely within the cell. Thus, a cellular system is limited in its ability to provide services requiring the precise location of the user.

In the present disclosure, it is only necessary to provide the mobile unit a method of determining its own location. It is not necessary to provide tracking of the mobile unit's whereabouts. For example, upon establishing a connection with an AP 10, the mobile unit 5 can transmit a message inquiring "Where is this AP?" Upon receiving the answer that the AP 10 is located at the user's destination airport, the mobile unit can then transmit an E-mail to a car rental agency or hotel to AP 10. AP 10 routes the message through a network connected to AP 10 so that the user's car or hotel room is ready upon his arrival. Once the message is provided to the AP, it is not necessary to continue to track the user.

In another approach according to the disclosure, one or more selected APs 10 can be programmed to watch for the arrival of a particular mobile unit (target mobile unit). Upon detecting the presence of the target mobile unit, the AP 10 establishing the link with the target mobile unit sends a message directly to the rental car agency, hotel, etc. Since the message has been sent, other APs can then be directed to cease watching for the target mobile unit.

Another feature according to the disclosure allows the user to access a service provider over a network connected through the access point. For example, upon establishing its location, a mobile unit can direct an inquiry through the AP over the network connected to the user's bank to locate the nearest ATM. Since the user's location is established with relative precision by the location of the AP, the service provider can respond with a message such as "Straight ahead to exit 3, turn right and proceed two blocks." The message is routed to the user through the same AP.

According to the disclosure, service can be initiated by the mobile unit's transmission of an inquiry requiring a response. Alternatively, service can be initiated by an element of the network, such as a service provider, when an AP 10 detects the presence of a mobile unit. As an element of the network, the AP 10 could access its memory to initiate the service or transmit a message over the network to a service provider who initiates the appropriate service.

A system according to the disclosure would include a plurality of APs and mobile units and could be configured to allow all users access to all service providers on a network or to allow selected users access to selected service providers, depending on a service profile contracted for by the user. For example, according to the disclosure, system software could be programmed to provide service gates in which a user identification code is compared with a list of authorized codes for access to the particular service. In addition, users could contract for unlimited access for a fixed fee or for time billed access or some combination thereof. Service usage records for billing and other purposes can be maintained in an automated database, so that users can be billed by a single entity that maintains the network of APs or individually by each service provider.

Assume, for example, that a user of the mobile unit 5 is located at an airport and that several APs 10 are located at the same airport. The mobile unit 5 is connected to an antenna 6, and AP 10 is connected to an antenna 8 which can both receive and transmit radio frequency (RF) signals at designated transmit and receive frequency bands. RF signals over-the-air from AP 10 are received by the antenna 6, and sent to mobile unit 5.

The mobile unit 5 can send information to the AP 10, for example, in order to retrieve messages or obtain information needed by the user or to send messages and data to other users. These messages are entered by the user through the mobile unit 5 or can be automatically generated, as in the previously described case of sending a message to a car rental company signaling the user's arrival at the airport. During this process, antenna 6 transmits the RF signal which is received by antenna 8 and sent to AP 10.

In one embodiment, when a beacon signal output from the mobile unit 5 is detected and received by AP 10, information in the beacon signal identifying the mobile unit is transmitted back to network 15. The information sent back to network 15 includes the identification number of the mobile unit 5 and AP 10, thereby identifying both the user and his location to the network. Using this identification and location data, network 15 provides desired services (or arranges to provide desired services by accessing appropriate providers) and essential information to the user of the mobile unit 5. Based on the type of information required, network 15 may access one or more information providers 20 to provide the information or services to the user. One or more information providers 20 are coupled to network 15 in a ring-network configuration, a star-network configuration, or other type of connection known in the art.

Other query/response approaches to link the mobile unit 5 and AP 10 could also be employed within the scope of the disclosure. For example, AP 10 could scan its coverage area, thereby causing a mobile unit 5 in the area to generate a response using active or passive circuitry. Such a response could be either a simple presence indication causing the AP 10 to transmit a further inquiry message requesting the mobile unit's identification information. Alternatively, in response to an AP scan, the mobile 5 could transmit its identification data immediately. Since a mobile unit may be in an area serviced by an AP for some time, either the AP or the mobile unit could be configured to determine if any correspondence is necessary before engaging in further communication.

In a simplified configuration according to the disclosure, the mobile unit could be configured merely as a device to locate its user through the APs 10. In this case, a processor on the network 15 would then take the appropriate action, such as sending an E-mail to the user's car rental agency, upon detection of the user's presence by an AP.

Network 15 shown in FIG. 1 stores information in the MIB 25. MIB 25 is a mechanism, such as a memory, which allows the persistent storage of information needed by network 15 to operate. Examples of such information include a directory of all the elements (APs, mobile units, etc.) in the network, the topology of the network, characteristics of individual network elements, characteristics of connection links, performance and trend statistics, and any information which is of interest in the operation of the network 15. For example, the MIB would store the precise longitude, latitude, altitude and other geographic information pinpointing the location of each AP 10. Alternatively, an access point can be located by its proximity to another known location. For example, an access point location may be defined as a particular hotel known to be a particular address or having known latitude and longitude coordinates. The extent of geographic area covered by an access point may be defined in the same ways.

In order to reduce message traffic over the network, all or part of MIB may be stored at one or more access points 10. In particular, static information which does not change, or changes relatively infrequently, can be stored in the AP 10. Thus, as shown in FIG. 1, AP 10 includes a memory 27 for storing at least a portion of the MIB. For example, memory 27 could store the location of the AP 10, the local map, local services and other information, such that routine requests for information from the mobile unit, such as "Where am I" requests need not be serviced over the network, leaving more resources for other message traffic.

By way of example and not limitation, service and information providers 20 may include car rental agencies, hotels, restaurants, airline reservation centers, banks, taxi services, bus and train reservation offices, printing services, on-line database services, message services, and E-mail providers, so that the user can receive messages. The system according to the disclosure may also provide the user access to updates on specific databases, such as a database maintained by the user's employer (e.g., a company rolodex) or the user's own personal databases and any other service which can be used in a remote manner.

Any of the service and information providers 20 may maintain in memory data files on members and subscribing merchants and have the ability to extract data from past transactions for each of the users to facilitate future plans. In this way, the service providers have available the information to learn the past habits and preferences of their subscribers and provide corresponding services for new transactions.

For example, upon learning that a business traveler is scheduling a trip to Austin, service and information providers 20 consider the previous trips by the traveler develop a suggested itinerary, and book travel, hotel, car and restaurant reservations. The information providers 20 acquire knowledge about the habits of the traveler over a period of time, store the information in a memory, and extrapolate information from past habits for probable future actions consistent with these past actions. For example, when arranging for a rental car, the information stored in the service provider's memory for a particular subscriber may indicate that the subscriber typically requests a four door intermediate size car.

Referencing this information, the service provider would now reserve a similar vehicle, unless otherwise instructed by the mobile unit.

A system according to the disclosure also has processing and memory access to operate in an interactive or adaptable mode. For example, when the user of the mobile unit 5 arrives at the airport, his identity, as well as the fact that he is at the airport, is detected by AP 10 and transmitted to the network, for example using the beacon signal emitted from his mobile unit 5, as previously described. One or more service providers with access to transportation schedules, flight status information, hotel or automobile rental information, weather information, ground maps or other information desired by the user employs network 15 to send the user updated information about whether a connecting flight has been delayed, alternative routings, where to go to pick up a pre-specified rental car, directions to a preferred hotel and other types of information.

Since the location of the AP 10 communication with a mobile unit 5 is known precisely, service and information provider 20 can employ processors to provide only suitable information to the user and can track the user's last reported location. For example, since updated information can be sent to the mobile unit 5, based on the location of the mobile unit 5, information that is pertinent only to the fact that the user of the mobile unit 5 is at the airport need be sent back to the mobile unit 5 via the communication path between AP 10 and the mobile unit 5. Other information can be sent at other times.

For purposes of illustration, FIG. 1 shows one AP 10 and one service and information provider 20 connected to network 15. However, any number of such APs and service and information providers would typically be connected to network 15 to service any number of mobile units, the only limitations being physical ones, such as constraints on bandwidth.

In a variation of a system according to the disclosure, the mobile unit 5 initiates a request for information from the network 15. For example, the user of the mobile unit 5 finds the location of the nearest automatic teller machine (ATM) by entering the request into the mobile unit 5, which will be received by the nearest AP 10. AP 10 forwards this request for information to the network 15. Network 15 routes the request to a service and information provider who obtains the requested information transmits it back to mobile unit 5 through AP 10.

In another variation of a system according to the disclosure, network 15 is connected to other types of communications networks, such as a public switched telephone network (PSTN), whereby the user of the mobile unit 5 sends and receives information from/to the PSTN or other communication network through a service provider. The service provider would employ processors and other apparatus to convert protocols and data formats from those used on the network 15 to those compatible with the PSTN or other communication network. For example, the user may receive facsimile information from a PSTN connected to the network 15.

Another feature according to the disclosure is the ability to adjust time clocks in the mobile unit to display and generate schedules using the correct time in the time zone where the user is located. This feature could be accomplished by sharing in the MIB a time zone identifying code for each access point and during communication between an access point and a mobile unit, notifying the mobile unit of the correct zone. Alternatively, the time zone information could be stored in the access point or the access point could be instructed to check with a time reference (e.g., Greenwich Mean Time) and calculate local time. Alternatively, the time zone could be determined for the longitude of the access point stored in the MIB. This determination could be made either by the information provider and transmitted as a time zone message to the mobile unit or could be determined in the mobile unit using the longitude information of the access point.

Still another feature according to the disclosure is the ability to provide customized messages based on the location of the active access point or based on the user's profile. For example, a user accessing a network through an access point in a hotel may be provided information about promotions offered by that hotel or other affiliated hotels, airlines, car rental agencies or other providers of goods and services.

The apparatus and method according to the disclosure and many of its attendant advantages will be understood from the foregoing description and it will be apparent that various changes may be made in form, construction and arrangement of the parts thereof without departing from the spirit and scope of the disclosure or sacrificing all of its material advantages, the form described here being merely a preferred embodiment thereof.

What is claimed is:

1. A method comprising:
    receiving, at an information provider, identification information of a portable computing device from a wireless access point;
    determining, at the information provider, a service, a product, or both, to be potentially used by a user of the portable computing device, wherein the service, the product, or both, is determined based on a prior user preference of the user, and wherein the prior user preference is obtained from a user profile identified based on the identification information; and
    selecting, at the information provider, an advertisement associated with a business, the advertisement selected based on the service, the product, or both, to be potentially used by the user and a geographic location of the wireless access point.

2. The method of claim 1, wherein the business is located within a proximity of the geographic location of the wireless access point.

3. The method of claim 1, wherein the service relates to a particular service provided by the business.

4. The method of claim 1, wherein the product relates to a particular product offered by the business.

5. The method of claim 1, wherein the portable computing device includes a mobile communication device.

6. The method of claim 1, further comprising sending the advertisement to the portable computing device via the wireless access point.

7. The method of claim 1, wherein the wireless access point is associated with an airport terminal, wherein the service includes renting a vehicle, and wherein the advertisement is associated with a vehicle rental agency.

8. The method of claim 1, wherein the identification information includes an identification number of the portable computing device.

9. The method of claim 1, wherein the advertisement includes information indicating directions to the business from the geographic location of the access point.

10. A system comprising:
    a processor; and
    a memory coupled to the processor, wherein the memory includes instructions executable by the processor to perform operations comprising:
        receiving identification information of a portable computing device from a wireless access point;

determining a service, a product, or both, to be potentially used by a user of the portable computing device, wherein the service, the product, or both, is determined based on a prior user preference of the user, and wherein the prior user preference is obtained from a user profile identified based on the identification information; and selecting an advertisement associated with a business, the advertisement selected based on the service, the product, or both, and a geographic location of the wireless access point.

11. The system of claim 10, wherein the advertisement comprises video data, voice data, text, or a combination thereof.

12. The system of claim 10, wherein the memory and the processor are included in a computing device of an information provider.

13. The system of claim 12, wherein the information provider is associated with the business.

14. The system of claim 10, wherein the prior user preference is based on a prior user transaction.

15. The system of claim 10, wherein the geographic location of the wireless access point is associated with a mass transit center.

16. A computer-readable storage device comprising instructions executable by a processor to perform operations including:

receiving identification information of a portable computing device from a wireless access point;

determining a service, a product, or both, to be potentially used by a user of the portable computing device, wherein the service, the product, or both, are determined based on a prior user preference, and wherein the prior user preference is obtained from a user profile identified based on the identification information; and selecting an advertisement associated with a business, the advertisement selected based on the service, the product, or both, and a geographic location of the wireless access point.

17. The computer-readable storage device of claim 16, wherein the operations further comprise selecting a second advertisement associated with a second business, the second advertisement selected based on the user and the geographic location of the wireless access point.

18. The computer-readable storage device of claim 17, wherein the second advertisement relates to a second particular service, a second particular product, or both, offered by the second business within proximity of the geographic location.

19. The computer-readable storage device of claim 16, wherein the wireless access point is associated with a hotel, wherein the service includes reserving a room at the hotel, and wherein the advertisement is associated with the hotel.

20. The computer-readable storage device of claim 19, wherein the operations further comprise sending a second advertisement to the portable computing device, the second advertisement providing information related to a promotion offered by a second hotel distinct from the hotel.

* * * * *